United States Patent [19]

Nimiya et al.

[11] Patent Number: 4,933,512
[45] Date of Patent: Jun. 12, 1990

[54] CABLE CLOSURE

[75] Inventors: Takayuki Nimiya; Tsuneto Hinohara; Kazuki Yuhara; Yuji Kotani, all of Tsukuba; Masato Hirata, Iokyo; Mitsuyoshi Katsuse, Migashiyamato; Hiroshi Takahashi, Toda; Kenji Kosugi, Fukuoka, all of Japan

[73] Assignee: Nippon Telegraph and Telephone Corporation, Japan

[21] Appl. No.: 271,866

[22] Filed: Nov. 17, 1988

[30] Foreign Application Priority Data

Nov. 18, 1987 [JP] Japan ............... 62-289388
Jul. 25, 1988 [JP] Japan ............... 63-97384[U]
Sep. 30, 1988 [JP] Japan ............... 63-246244

[51] Int. Cl.$^5$ ............... H02G 15/113
[52] U.S. Cl. ............... 174/92; 29/868; 156/49; 174/77 R; 174/93
[58] Field of Search ............... 174/77 R, 92, 93; 29/868; 156/49

[56] References Cited

U.S. PATENT DOCUMENTS

| | | | |
|---|---|---|---|
| 3,130,259 | 4/1964 | Rischard et al. | 174/77 R |
| 3,233,035 | 2/1966 | Black | 174/93 |
| 3,614,298 | 10/1971 | Thompson | 174/92 |
| 3,692,926 | 9/1972 | Smith | 174/92 |
| 3,775,204 | 11/1973 | Thompson et al. | 156/53 |
| 3,869,189 | 3/1975 | McCurdy | 174/77 R X |
| 4,295,005 | 10/1981 | Daugherty et al. | 174/92 |
| 4,341,922 | 7/1982 | Bossard et al. | 174/92 |
| 4,381,425 | 4/1983 | Maricevic' et al. | 174/93 |
| 4,538,021 | 8/1985 | Williamson, Jr. | 174/92 |
| 4,558,174 | 12/1985 | Massey | 174/92 |
| 4,720,605 | 1/1988 | Tokumaru et al. | 174/93 |

FOREIGN PATENT DOCUMENTS

| | | | |
|---|---|---|---|
| 0110673 | 6/1984 | European Pat. Off. | |
| 2432384 | 1/1976 | Fed. Rep. of Germany | 174/77 R |
| 2743937 | 4/1979 | Fed. Rep. of Germany | 174/93 |
| 723457 | 2/1955 | United Kingdom | 174/93 |

*Primary Examiner*—Morris H. Nimmo
*Attorney, Agent, or Firm*—Wigman & Cohen

[57] ABSTRACT

To reduce the number of parts, assembly work time and cost of a cable closure including a two-splittable cylindrical sleeve for covering the cable junction point, and a pair of two-dividable annular end plates fitted to both inner ends of the sleeve to close spaces between the cables and the sleeve, the end plates are formed by a rigid plastic material and gaps between the cable and the end plates are sealed by rubber airtight tape wound around the cable by adjusting the number of turns according to cable diameter. Further, two cable gripping means are fixed to the end plates, respectively to protect the junction point from external force applied between the two cables by the strength of the sleeve coupled to the end plates.

10 Claims, 6 Drawing Sheets

CABLE CLOSURE

BACKGROUND OF THE INVENTION

1. Field of the Invention

The present invention relates to a cable closure for protecting a junction point of two communication cables from water and external force (e.g. tensile, compressive, or vibrational force) applied between the two cables.

2. Description of the Prior Art

In usual, two communication cables are connected to each other by removing a cable sheath from a cable to expose a cable core and by connecting the two exposed cable cores. In this case, since it is necessary to protect the cable junction point from water and external force, a cable closure of airtight structure is attached to the cable junction point.

In addition, the cable and cable closure thereof are often filled with pressurized gas (e.g. air, nitrogen gas, etc. of about 1 at.) in order to improve the waterproof reliability thereof, which is called "gas maintenance". In this case, the cable closure is further required to prevent the pressurized gas from leaking from the inside to the outside thereof. Further, since there exist various cables of different diameters, there exists another requirement that the cable closure must be applicable to any junction points of cables of various diameters. Further, the cable are usually laid down in open air, there exist other requirements for sufficient durability, easy assembly/disassembly work, high strength, etc. in addition to the above-mentioned airtightness.

In the prior art cable closure, however, since cable junction point is protected from an external force by cable gripping members fixed to the cable core through slits formed in the cable sheath, and from water by non-elastic adhesive sealing tape material placed in spaces between the cable, elastic end plates, and sleeve, there exist various problems in that (a) firstly, various end plates must be prepared according to cables of different diameters and further the sleeve must be fastened against the elastic end plates by a great force for providing airtightness, thus resulting in a hard assembling work; (b) secondly, various-sized cable gripping members must be prepared according to cables of different diameters and plural slits must be formed in the cable sheath; (c) thirdly, since the non-elastic adhesive sealing tape material is used, it takes much time to disassemble the assembled cable closure; (d) finally, since the sealing washers for preventing the flow of the non-elastic sealing material are required, a great number of the components are needed to assemble the final cable closures, resulting in time consumption.

The arrangement of the prior-art cable closure and its drawbacks will be described in more detail hereinafter with reference to FIGS. 1(A), (B) and (C) under DETAILED DESCRIPTION OF THE PREFERRED EMBODIMENT.

SUMMARY OF THE INVENTION

With these problems in mind, therefore, it is the primary object of the present invention to provide a novel cable closure which can solve various problems involved in the prior-art cable closure such as lower applicability to cables of different diameters, insufficient airtightness for a long period of time, lower assembling and disassembling work efficiency, etc.

To achieve the above-mentioned object, a cable closure for closing a junction point of two cables, according to the present invention, comprises: (a) a sleeve for covering the cable junction point; (b) a pair of end plates, fitted to both inner ends of said sleeve, for closing spaces between the cables and said sleeve, said end plates being formed by a rigid material; and (c) first elastic sealing means for airtightly sealing gaps between the cables and said rigid end plates.

The end plate is made of a rigid plastic or a glass fiber reinforced plastic. The first elastic sealing means is an elastic airtight tape of ethylene propylene rubber wound around the cable by adjusting the number of tape turns according to cable diameter.

Further, the cable closure of the present invention further comprises cable gripping means engaged or formed integral with the end plate to protect the cable junction point from external force applied between the two cables by the strength of the sleeve coupled to the end plates, which comprises (a) a pair of two separable annular screw support members; (b) a plurality of cable fastening screws screwed into a plurality of threaded holes formed at regular angular intervals along outer circumference of each of said annular screw support members so as to be movable in the radial direction of said screw support member; and (c) a plurality of arcuate cable push members each formed with conical or triangle projections on an inner surface thereof, said cable push member being loosely fitted to a radially inner end of said cable fastening screw so that the conical or triangle projections are brought into tight contact with the cable sheath for cable gripping when said cable fastening screws are moved radially inward.

Further, the sleeve is a two-splittable cylindrical sleeve member fastened by plural sleeve fastening bands each provided with a buckle.

BRIEF DESCRIPTION OF THE DRAWINGS

The features and advantages of the cable closure according to the present invention over the prior art cable closure will be more clearly appreciated from the following description of the preferred embodiment of the invention taken in conjunction with the accompanying drawings and in which.

DETAILED DESCRIPTION OF THE PREFERRED EMBODIMENTS

To facilitate understanding of the present invention, a reference will be made to a prior art cable closure, with reference to the attached drawings.

Figure 1A:
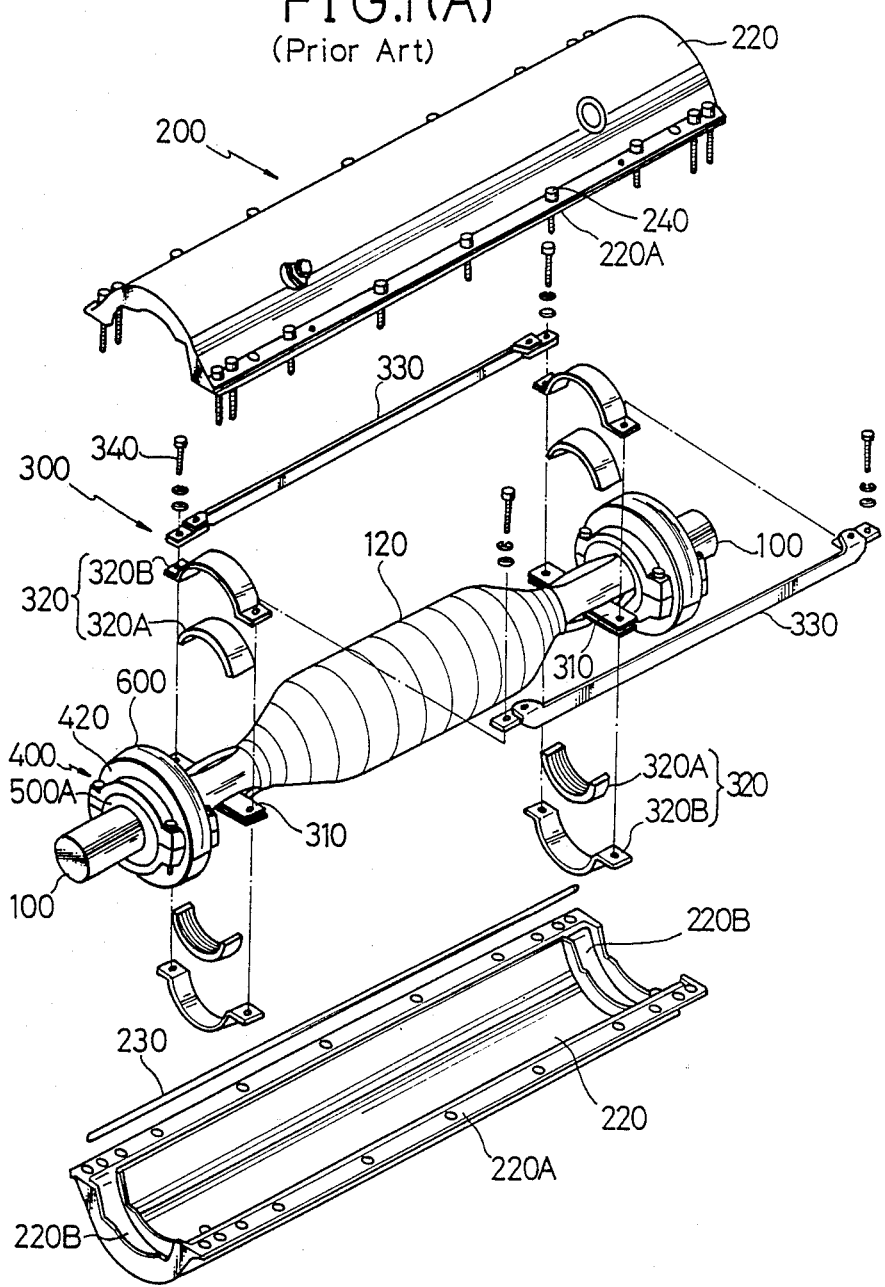
FIG. 1(A) is a perspective and partly exploded view showing an example of prior art cable closure.

In FIGS. 1(A), (B) and (C) two cables 100 are connected and protected by winding an insulating tape around the cable junction point 120. A cable closure is roughly composed of a two-slittable cylindrical sleeve 200, a set of cable gripping members 300 and a pair of two-dividable annular end plates 400.

The sleeve 200 can be split into two semicylindrical sleeve members 220 and fixed to each other with plural bolts 240 by putting two flange portions 220A of one sleeve member 220 upon those 220A of the other sleeve member 220 with elastic adhesive sealing tape material 230 intervening between the two flange portions 220A.

Figure 1B:
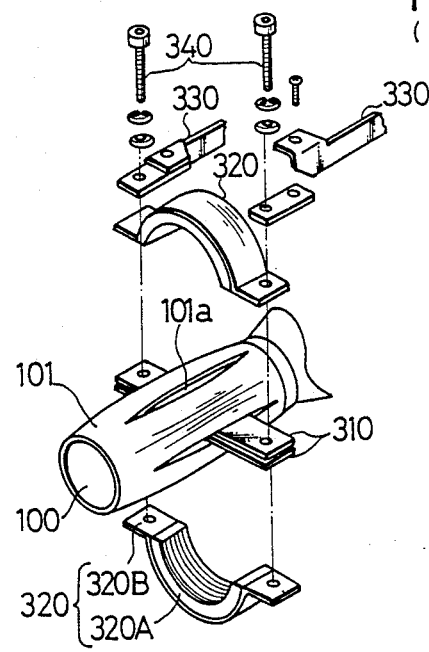
FIG. 1(B) is an enlarged exploded view showing cable gripping members incorporated in the prior art cable closure shown in FIG. 1(A)

The cable gripping members 300 comprises a pair of inner semicircular members 310 inserted into a space between a cable core (not shown) and a cable sheath 101 through slits 101a formed in the cable sheath 101 as shown in FIG. 1(B) (in which only the flat portions of the members 310 are shown); a pair of outer semicircular members 320 (each including an inner member 320A and an outer member 320B) fitted to an outer circumferential surface of the cable sheath 101, and a pair of connecting bars 330.

These three, inner semicircular members 310, outer semicircular members 320 and connecting bars 330 are fixed to each other simultaneously with plural bolts 340 so as to protect the cable junction point 120 from external force applied between the two cables 100 by the strength of the connecting bars 330.

Figure 1C:
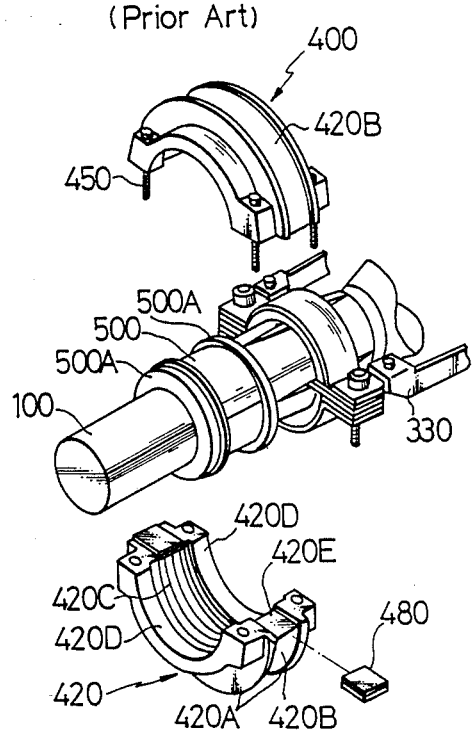
FIG. 1(C) is an enlarged exploded view showing an end plate incorporated in the prior art cable closure shown in FIG. 1(A)

The end plate 400 also can be divided into two semiannular end plate members 420. As depicted in FIG. 1(C) each semiannular end plate member 420 made of elastic (rubber) material is formed with a pair of semicircular flange portion 420A, an outer semicircular recessed portion 420B formed between the two flange portions 420A, an inner semicircular recessed portion 420C, two inner washer holding portions 420D, and two flat surface recessed portions 420E. These two semiannular end plate members 420 are fixed to each other with four bolts 450 with non-elastic adhesive sealing tape material 480 intervening between the two flat surface recessed portions 420E of the two end plate members 420.

In assembly of the cable closure as described above, non-elastic adhesive sealing tape material 500 is attached to the outer circumferential surface of the cable sheath at two positions where the two end plates 400 are fixed. In this case, two sealing material support washers 500A made of elastic (rubber) material are fitted to the cable 100, as depicted in FIG. 1(C), for prevention of the sealing material 500 from being slipped away from the predetermined positions.

The semiannular end plate members 420 are fixed to each other with the four bolts 450 by putting the adhesive sealing tape material 480 upon the two flat surface recessed portions 420E thereof and by engaging the outer circumferential surfaces of the sealing material support washers 500A with the inner circumferential surface of the cable washer holding portions 420D thereof, with the adhesive sealing tape material 500 sandwiched between the two semiannular end plate members 420.

Thereafter, a similar non-elastic adhesive sealing tape material 600 is attached to the outer semicircular recessed portions 420B of the two fixed end plate members 420. Further, the two semicylindrical sleeve members 220 are fixed with the bolts 240 by engaging the sealing material 600 (or the two flange portions 420A of the end plate 420) with the recessed portion 220B formed on the inner end circumferential surface of the sleeve member 220. In this case, the two sealing members 230 are put between the two flange portions 220A of the two sleeve members 220, respectively, as already described.

In the above-mentioned prior art cable closure, the cable junction point 120 is covered by two end plates 400 and the sleeve 200. The airtightness between the cable 100 and the end plates 400 can be attained by the non-elastic adhesive sealing tape material 500 attached around the cable 100 and between the two sealing material rubber support washers 500A. Here, it should be noted that these two rubber support washers 500A serve only to support sealing material 500 and not to serve as air-tightening members. The airtightness between the end plates 400 and the sleeve 200 can be attained by the similar non-elastic adhesive sealing tape material 600 attached around the end plates 400. The airtightness between the two semiannular end plate members 420 can be attained by the two non-elastic adhesive sealing tape material 480 attached applied onto the two flat surface recessed portions 420E of the end plate members 420. Further, the airtightness between the two semicylindrical sleeve members 220 can be attained by the elastic adhesive sealing tape materials 230.

In summary, in the prior art cable closure, non-elastic adhesive sealing tape material is used to obtain airtightness of the cable closure. Further, the cable junction point 120 is reinforced against external force applied between the two cables 100 by the connecting bars 330 of the cable gripping members 300.

In the prior art cable closure, however, there exist various problems as follows:
(1) Higher cost
 (a) Since the cable gripping members 300 including the inner semicircular members 310, and the outer semicircular member 320 must be fitted to the cable 100, it has been necessary to previously prepare many kinds of the cable gripping members 300 of different sizes according to various cables of different diameters.
 (b) Since the space between the cable 100 and the end plates 400 is sealed by the non-elastic adhesive sealing material 500, there inevitably exists a limit of the amount of the sealing material to be provided around the cable 100. Therefore, it has been necessary to previously prepare many kinds of end plates 400 and the sealing washers 500A according to various cables of different diameters. Or else, an inner semicircular hollow portion of the end plate 400 must be adjusted according to the size of the cable, at each site of construction, with a special tool, and also a thickness of the end plate 400 in the longitudinal direction thereof must be made thick enough to attain the airtightness.
(2) Longer assembling time
 (a) Since four or six slits 101a must be formed on the cable sheath 101 before inserting the inner semicircular members 310 into between the cable core and the cable sheath, it takes a relatively long assembly time.

(b) Since the airtightness between the cable 100 and the end plates 400 and that between the end plates 400 and the sleeve 200 are maintained by the non-elastic adhesive sealing tape material 500 and 600, the end plates 400 must be made of an elastic (rubber) material. In this case, ever if the end plate 400 is fastened tightly with the end plate bolts 450, since the end plate 400 is deformed partially or locally, it has been necessary to tightly fasten the two sleeve members 220 with the sleeve bolts 240 to compress the end plates 400 in the radially inward direction thereof uniformly over the circumferential direction thereof. Therefore, many sleeve bolts 240 have been tighten by applying a torque as large as 180 kg-cm to each bolt 240, thus resulting in hard assembly work within a relatively small working space such as within a manhole. The above-mentioned problem results from the fact that in the prior art closure device, the airtightness is mainly dependent upon the adhesive force of the adhesive tape.

(3) Others (a) Since the cable junction point is reinforced by the connecting bars 330, and furthermore the slits 101a are formed in the cable sheath 101, the inner space, defined within the cable closure, capable of storing the cable 100 is reduced.

(b) Since adhesive sealing material is used for providing airtightness of the cable closure, it takes much time in disassembling the cable closure when the cables are required to be reconnected.

In view of the above description, reference is now made to an embodiment of the cable closure according to the present invention.

The feature of the cable closure of the present invention is to attain the airtightness between the cable and the end plates and between the end plates and the sleeve, in dependence upon rigid (e.g. plastic) end plates and elastic (rubber) airtight members, so as to be applicable to any cables of different diameters.

Further, another feature of the present invention is to provide simple cable gripping members engaged with each end plate, without use of any connecting bars, so as to reinforce the strength of the cable junction point by the aid of the sleeve.

The cable closure of the present invention is roughly composed of a two-splittable cylindrical sleeve 20, a pair of annular cable gripping members 30 including three cable fastening screws, and a pair of two-dividable annular end plates 40. It should be noted that the annular end plate 40 may be divided into, e.g., three or more plates.

Figure 2:
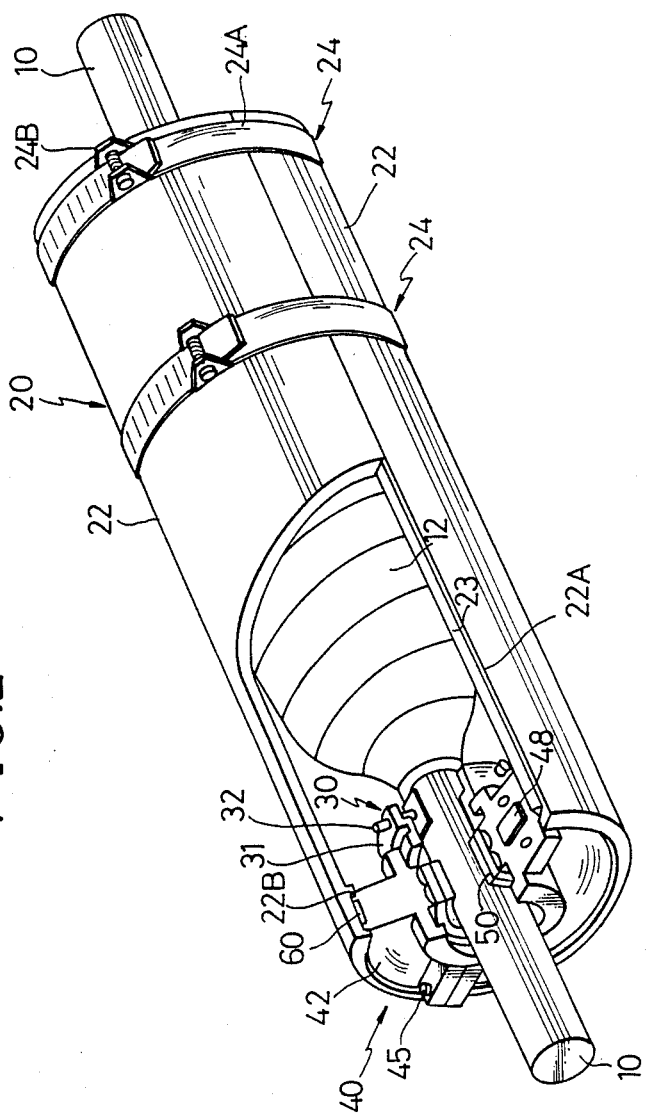
FIG. 2 is a perspective, partly broken view showing a cable closure according to the present invention.

With reference to FIG. 2, the sleeve 20 can be divided into two semicylindrical sleeve members 22, and fixed to each other with plural sleeve fastening members 24 each composed of a metal band 24A and a buckle 24B. These sleeve fastening members 24 are arranged at regular intervals along the longitudinal direction of the sleeve 20. Further, two elastic (rubber) sealing members 23 are disposed between two end surfaces 22A of each sleeve member 22, when the two sleeve members 22 are fixed to each other, to provide airtightness between the two. Further, each sleeve member 22 is formed with two inner end recessed portions 22B engageable with the end plates 40.

The feature of the sleeve 20 of the present invention is formed with no flange portions as in the prior art sleeve shown in FIG. 1(A). This is because it is unnecessary to strongly tighten the end plates 40 by the sleeve 20. Therefore, the shape of the sleeve 20 can be minimized and simplified.

Figure 4:
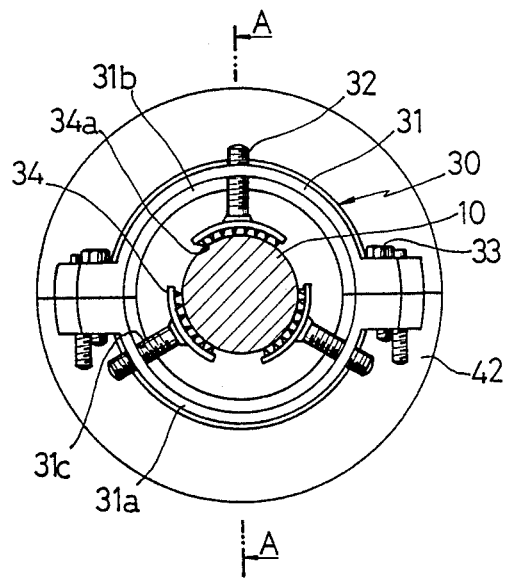
FIG. 4 is an enlarged side view showing an end plate and a cable gripping member incorporated in the cable closure of the present invention shown in FIG. 2.
Figure 5:
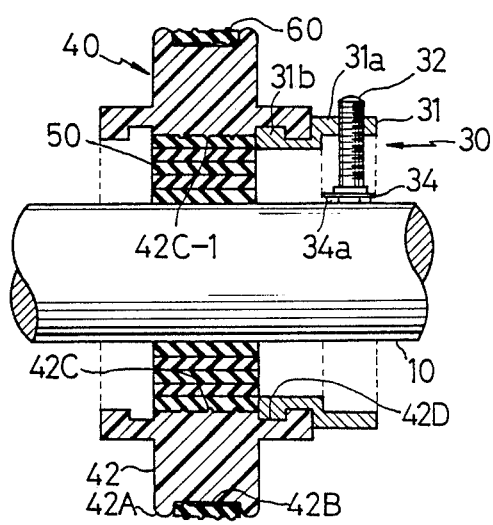
FIG. 5 is an enlarged cross-sectional view taken along the line A—A in FIG. 4.

With reference to FIGS. 4 and 5, the cable gripping members 30 comprise a two separable annular, screw support member 31, plural (e.g. three) cable fastening screws 32, and plural arcuate cable push members 34 each formed with a plurality of conical projections 34a on the radially inward surface thereof. The two separable annular screw support member 31 is formed with a large-diameter portion 31a, along the circumferential surface of which the cable fastening screws 32 are arranged at regular angular intervals, and a small diameter portion 31b formed with a recessed portion engageable with the end plate 40. The arcuate cable push member 34 is rotatably attached to an innermost end of the cable fastening screw 32. This cable fastening screw 32 provided with the movable cable push member 34 is screwed into a threaded hole 31c formed on the circumferential surface of the annular screw support member 31 from the inside thereof.

In assembly, the two semiannular screw support members 31 are fixed to each other with bolts 33 with the cable 10 intervening between the two 31. Thereafter, the three cable fastening screws 32 are screwed radially inward toward the cable 10 uniformly so that the three arcuate cable push members 34 can be brought into contact with the outer circumferential of the cable sheath 11 uniformly for cable gripping. Since the conical projections 34a formed on the inner surface of the arcuate cable push member 34 go into the cable sheath, the cable 10 is firmly gripped by the cable gripping member 30.

Figure 3:
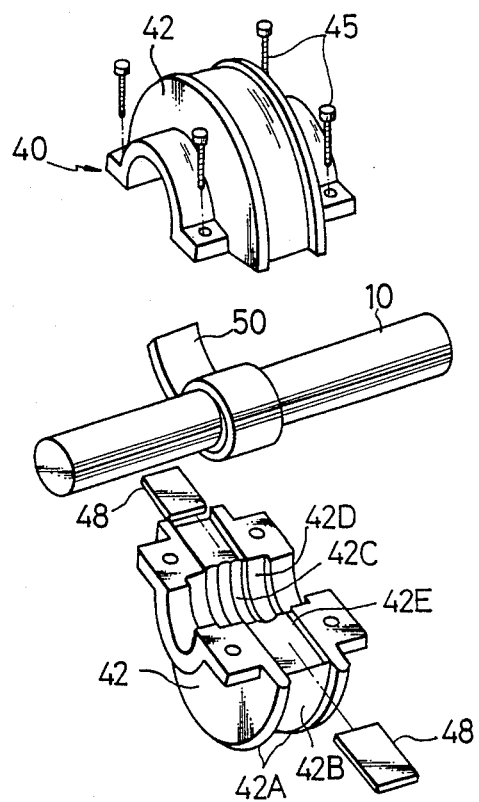
FIG. 3 is a perspective and exploded view showing an end plate incorporated in the cable closure of the present invention shown in FIG. 2.

With reference to FIGS. 3 and 5, each end plate 40 also can be divided into two semiannular end plate members 42. In this embodiment, the end plate 40 is made of a rigid material such as plastic (being different from the prior-art rubber end plate 400 shown in FIG. 1). Each end plate member 42 is formed with a pair of semicircular flange portions 42A, an outer semicircular recessed portion 42B formed between the two flange portions 42A, an inner semicircular portion 42C formed with inner semicircular projections 42C-1 (FIG. 5) for gripping the seal member 50, and an end inner semicircular recessed portion 42D engageable with the cable gripping member 30, and two flat surface recessed portion 42E.

The sealing method of the above-mentioned major elements will be described hereinbelow.

To seal the cable 10 and the end plate 40, an elastic (rubber) airtight tape 50 is wound two or three turns around the cable 10 as shown in FIG. 3. However, the number of turns of this airtight tape is adjustable according to the diameter of the cable. In the same way, to seal the end plate 40 and the sleeve 20, an elastic airtight tape 60 similar to the above-described airtight tape 50 is wound around the outer semicircular recessed portion 42B of the end plate member 42 as shown in FIG. 5.

To seal the two end plate members 42, a non-elastic adhesive sealing tape material 48 is sandwiched between the two flat surface recessed portions 42E of the two end plate members 42. To seal the two semicylindrical sleeve members 22, a longitudinal gasket strip 23 is sandwiched between the two end surfaces 22A of the two sleeve members 22.

As the above-mentioned airtight rubber tape, it is preferable to use ethylene propylene rubber called EPDM (Ethylene Propylene Diene Methylene) whose hardness is approximately 55 degrees when measured by an A-type spring hardness tester standardized in JIS. In this test method, a certain number (6 or more) of rubber tapes are stacked to obtain a test sample whose thickness is 12 mm or more; a test surface of the hardness tester is brought into contact with the surface of the test sample to measure a distance (degree) that a test needle (urged by a spring load (1000 gf or 9.81N) and projecting through a hole formed in the test surface) is pushed back by an elastic force of the test rubber sample.

Figure 6A:
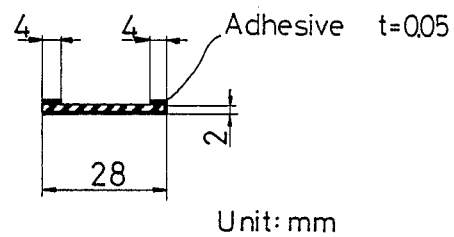
FIG. 6(A) is an enlarged cross-sectional view of elastic sealing airtight tape used for the cable closure according to the present invention.
Figure 6B:
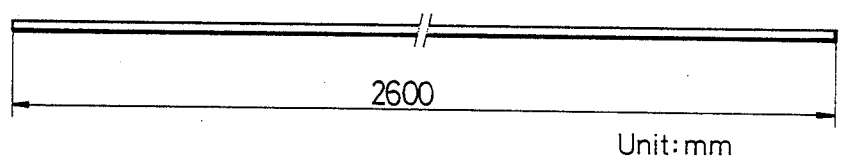
FIG. 6(B) is a side view of the same elastic sealing airtight tape shown in FIG. 6(A); and, FIG. 7 is a view showing the elastic sealing airtight tape wound around a reel.
Figure 7:
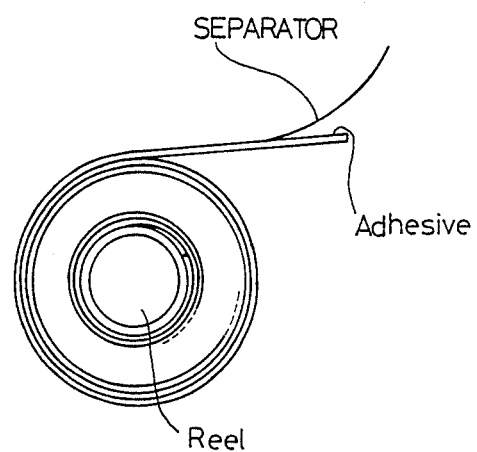

FIGS. 6(A) and 6(B) show an example of the dimensions of the airtight tape. In FIG. 6(A), the thickness thereof is about 2 mm and the width thereof is about 28 mm. Further, it is particularly preferable to apply an adhesive (width: 4 mm; thickness: 0.05 mm) onto both side ends of one surface of the airtight tape in order to facilitate tape winding work (because, it is unnecessary to hold the tape by the hand for prevention of tape from being loosened). Further, the total length of the airtight tape is about 2600 mm as shown in FIG. 6(B) and wound around a reel with a separator paper intervening between the two as depicted in FIG. 7. The airtight tape is wound around the cable 10 by removing the separator paper from the tape.

The assembling procedure of the cable closure of the present invention will be described hereinbelow.

The two cable gripping members 30 are first fixed to the cable 10 at two positions a predetermined distance away from each other on both the sides of the junction point 12. Each cable gripping member 30 is separated into two semiannular screw support members 31 and fixed with bolts 33 by passing the cable 10 through the central hollow portion formed by the two screw support members 31. Thereafter, the three cable fastening screws 32 are tightened with a screw driver whose torque can be determined at any desired value to bring each arcuate cable push member 34 into tight contact with the cable sheath.

Under these conditions, since the conical projections 34a of the cable push member 34 go into the cable sheath, it is possible for the cable push member 34 to grip the cable firmly.

The elastic (rubber) airtight tape 50 is wound around the cable 10 near the two fixed cable gripping members 30, as shown in FIG. 3. In this case, the turns of the airtight tape 50 are determined under consideration of the cable diameter.

Thereafter, each end plate 40 is separated into two semiannular end plate members 42 and fixed with bolts 45 by sandwiching the wound airtight tape 50 between the two end plate members 42, and the sealing member (non-elastic sealing material) 48 between the two flat surface recessed portions 42E of the end plate members 42. Further, when the two end plate members 42 are fixed to each other, the inner semicircular recessed portion 42D of the end plate members 42 are engaged with the small diameter portion 31b of the cable gripping member 30.

The elastic (rubber) airtight tape 60 is wound around the outer recessed portions 42B of the end plate 40 by a predetermined turn.

The sleeve 20 is separated into two semicylindrical sleeve members 22 and fixed with plural sleeve fastening members 24 with the outer circumferential portions (i.e. the airtight tape 60) of the two end plates 40 engaged with the two inner end recessed portions 22B formed in the sleeve members 22. When the two sleeve members 22 are fixed to each other, the gasket strip 23 is attached to the two end surfaces 22A of each of the two sleeve members 22.

Under these assembled conditions, since the two cable gripping members 30 are connected to the sleeve 20 via the two rigid end plates 40, it is possible to protect the cable junction point 12 from external force applied between the two cables by the strength of the sleeve 20. Furthermore, since the airtightness between the cable 10 and end plates 40 is achieved by the airtight tape, the airtightness between the end plates 40 is attained by the adhesive sealing material, the airtightness between the sleeve 20 and end plates 40 is established by another airtight tape having the same material but different shape from that of the first-mentioned airtight tape, and also the airtightness between the sleeves 20 is provided by the longitudinal gasket strip 23, it is possible to protect the cable junction point 12 from water or to prevent the inner pressurized gas from leaking outside.

In the above embodiment, it is preferable to form the end plates 40 and the sleeve 20 by the same material from the airtightness standpoint, because there exists no difference in expansion and contraction rates between the end plates 40 and the sleeve 20.

Further, although the cable gripping member 30 is provided separately from the end plate 40, it is also preferable to form the screw support member 31 integral with the end plate member 42.

Further, when a large mechanical strength is required for the end plate to protect the cable junction point from external force according to the circumference, it is preferable to form the end plates by a plastic material reinforced by glass fiber or to provide ribs for the end plate.

The cable closure according to the present invention as described above has various advantages as follows:

(a) Since the airtightness between the cable 10 and the end plates 40 can be obtained by winding elastic airtight tape 50, even if a gap between the cable 10 and the inner circumferential surface of the end plate 40 changes according to change in cable diameter, it is possible to adjustably fill the gap with the airtight tape 50, thus eliminating the need of preparing various sized end plates 40 according to the cable diameters. Further, it is possible to eliminate the prior art sealing washers 500A, thus reducing the cost thereof.

(b) Since the cable gripping member 30 can grip the cable sheath by adjustably moving the cable fastening screws 32 in the radial direction thereof, it is possible to markedly reduce the number of elements, eliminate the need of preparing various sized cable gripping members according to the cable diameters. Further, it is unnecessary to form slits on the cable sheath, thus reducing the cost and the assembly time thereof.

(c) Since the airtightness between the cable 10 and the end plates 40 and between the end plates 40 and the sleeve 20 can be attained by elastic sealing material respectively, it is possible to markedly reduce the sleeve tightening force from 180 kg-cm (in prior art) to 70 kg-cm (in the invention).

(d) Therefore, it is possible to fasten the sleeve 20 with plural bands 24, in place of bolts, without providing the flange portions (as in the prior art), thus minimizing the sleeve size and facilitating the assembly work.

(e) Since the cable gripping members 30, the end plates 40 and the sleeve 20 are fixed integral with each other, it is possible to eliminate the connecting bars (as in the prior art), thus increasing the inner space within the cable closure.

(f) Since no adhesive sealing material is used for attaining airtightness, it is possible to facilitate the disassembly work.

As described above, in the cable closure according to the present invention, since the airtightness between various elements can be attained by adjustably providing a rubber airtight tape, a single predetermined-sized end plate is applicable to various cables of different diameters. Further, since the cable can be simply gripped by turning the cable fastening screws and reinforced by sleeve linked to the cable gripping means via the end plates, it is possible to reduce the number of cable gripping elements and facilitate the assembly work.

In practice, it is possible to reduce the assembly time by about 40 to 50% and the device cost by about 25 to 35% as compared with the prior art cable closure shown in FIG. 1.

What is claimed is:

1. A cable closure for closing a junction point of two cables, comprising:
   (a) a sleeve for covering a cable junction point;
   (b) a plurality of end plates, fitted to both inner ends of said sleeve, for closing spaces between said cables and said sleeve, said plurality of end plates being formed by a rigid material;
   (c) an elastic airtight tape wound one or more times around said cables, for airtightly sealing gaps between said cables and said rigid end plates, the number of tape turns being selected according to cable diameter; and
   (d) cable gripping means, coupled to each of said end plates in recess-projection engagement relationship, for gripping cables to protect a cable junction point from external force applied between two cables in dependence upon strength of said sleeve coupled to said end plates.

2. A method of assembling a cable closure, comprising the steps of:
   (a) winding an elastic airtight tape at two positions on both sides of a cable junction point between two cables by adjusting the number of tape turns according to cable diameter;
   (b) fixing a plurality of end plates by sandwiching the wound elastic airtight tape therebetween, respectively;
   (c) winding the elastic airtight tape on an outer circumferential surface of each of the end plates; and
   (d) fastening a two-splittable cylindrical sleeve member, with said end plates fitted to both inner and circumferential surfaces of the sleeve members, by use of a plurality of sleeve fastening bands each provided with a buckle.

3. The method of assembling a cable closure of claim 2, which further comprises the steps of:
   (a) fitting two cable gripping means to both the sides of the cable junction point;
   (b) engaging two cable gripping means with the two end plates, respectively before fixing the end plates; and
   (c) fixing the two cable gripping means to a cable sheath, respectively to protect a cable junction point from external force applied between two cables in dependence upon strength of the sleeve member coupled to the end plates; and
   (d) fixing the end plates.

4. A cable closure for closing a junction point of two cables, comprising:
   (a) a sleeve for covering a cable junction point;
   (b) a plurality of end plates, fitted to both inner ends of said sleeve, for closing spaces between said cables and said sleeve, said plurality of end plates being formed by a rigid material;
   (c) an elastic airtight tape wound one or more turns around said cables, for airtightly sealing gaps between said cables and said rigid end plates, the number of tape turns being selected according to cable diameter; and
   (d) second elastic sealing means for airtightly sealing gaps between said end plates and said sleeve.

5. The cable closure of claim 4, wherein said second elastic sealing means is an elastic airtight tape around said end plates.

6. The cable closure of claim 5, wherein said elastic airtight tape is made of an ethylene propylene rubber.

7. The cable closure of claim 4, which further comprises cable gripping means, coupled to each of said end plates in recess-projection engagement relationship, for gripping cables to protect a cable junction point from external force applied between two cables in dependence upon strength of said sleeve coupled to said end plates.

8. A cable closure for closing a junction point of two cables, comprising:
   (a) a sleeve for covering a cable junction point;
   (b) a plurality of end plates, fitted to both inner ends of said sleeve, for closing spaces between said cables and said sleeve, said plurality of end plates being formed by a rigid material;
   (c) an elastic airtight tape wound one or more turns around said cables, for airtightly sealing gaps between said cables and said rigid end plates, the number of tape turns being selected according to cable diameter;
   wherein said elastic airtight tape is coated with adhesive agent applied on both outer side ends of one surface of the tape for providing an easy tape winding around the cable.

9. The cable closure of claim 8, which further comprises cable gripping means, coupled to each of said end plates in recess-projection engagement relationship, for gripping cables to protect a cable junction point from external force applied between two cables in dependence upon strength of said sleeve coupled to said end plates.

10. A cable closure for closing a junction point of two cables, comprising:
    (a) a sleeve for covering a cable junction point;
    (b) a plurality of end plates, fitted to both inner ends of said sleeve, for closing spaces between said cables and said sleeve, said plurality of end plates being formed by a rigid material;
    (c) first elastic sealing means for airtightly sealing gaps between said cables and said rigid end plates;
    (d) cable gripping means, coupled to each of said end plates, for gripping cables to protect the cable junction point from external force applied between the two cables in dependence upon strength of said sleeve coupled to said end plates;
    (e) said cable gripping means comprising:
       (i) a pair of two separable annular screw support members;

(ii) a plurality of cable fastening screws screwed into a plurality of threaded holes formed at regular angular intervals along the outer circumference of each of said annular screw support members so as to be movable in the radial direction of said screw support member; and (iii) a plurality of arcuate cable push members each formed with conical projections on an inner surface thereof, said cable push members being loosely fitted to a radially inner end of said cable fastening screws so that the conical projections are brought into tight contact with a cable sheath for cable gripping when said cable fastening screws are moved radially inward.

* * * * *

UNITED STATES PATENT AND TRADEMARK OFFICE
CERTIFICATE OF CORRECTION

PATENT NO. : 4,933,512

DATED : June 12, 1990

INVENTOR(S) : Takayuki NIMIYA et al

It is certified that error appears in the above-identified patent and that said Letters Patent is hereby corrected as shown below:

<u>IN THE TITLE PAGE</u>

<u>Inventors</u>:

Please change the address of the fifth inventor, Masato Hirata from "Iokyo" to --Shinjuku-ku--.

Please change the address of the sixth inventor, Mitsuyoshi Katsuse from "Migashiyamato" to --Higashiyamato--.

Signed and Sealed this

Twenty-second Day of January, 1991

*Attest:*

HARRY F. MANBECK, JR.

*Attesting Officer*     *Commissioner of Patents and Trademarks*